US010655602B2

(12) United States Patent
Schwensen et al.

(10) Patent No.: US 10,655,602 B2
(45) Date of Patent: May 19, 2020

(54) PITCH CONTROL SYSTEM FOR PITCHING WIND TURBINE BLADE

(71) Applicant: Vestas Wind Systems A/S, Aarhus N. (DK)

(72) Inventors: John Schwensen, Randers NØ (DK); Kasper Zinck Østergaard, Flemming (DK); Jacob Hviid Nielsen, Tjele (DK); Jan Vestergaard Knudsen, Risskov (DK)

(73) Assignee: Vestas Wind Systems A/S, Aarhus N. (DK)

(*) Notice: Subject to any disclaimer, the term of this patent is extended or adjusted under 35 U.S.C. 154(b) by 130 days.

(21) Appl. No.: 15/767,268

(22) PCT Filed: Oct. 11, 2016

(86) PCT No.: PCT/DK2016/050329
§ 371 (c)(1),
(2) Date: Apr. 10, 2018

(87) PCT Pub. No.: WO2017/063655
PCT Pub. Date: Apr. 20, 2017

(65) Prior Publication Data
US 2019/0055922 A1 Feb. 21, 2019

(30) Foreign Application Priority Data

Oct. 14, 2015 (DK) .......................... PA 2015 70658

(51) Int. Cl.
*F03D 7/02* (2006.01)
*F03D 1/00* (2006.01)
*F03D 7/04* (2006.01)

(52) U.S. Cl.
CPC ............. *F03D 7/0224* (2013.01); *F03D 1/00* (2013.01); *F03D 7/047* (2013.01);
(Continued)

(58) Field of Classification Search
CPC ............. F03D 7/0224; F05B 2260/821; F05B 2260/76; F05B 2270/404
See application file for complete search history.

(56) References Cited

U.S. PATENT DOCUMENTS 7,677,154 B2 * 3/2010 Schmidt ................ F03D 7/0224
91/274
8,092,173 B2 * 1/2012 Knudsen ............... F03D 7/0264
416/1
(Continued)

FOREIGN PATENT DOCUMENTS

CN 101487446 A 7/2009
CN 101725472 A 6/2010
(Continued)

OTHER PUBLICATIONS

Chinese Patent Office, Office Action in CN Application No. 201680072748.X, dated Apr. 12, 2019.
(Continued)

*Primary Examiner* — Kenneth J Hansen
*Assistant Examiner* — Jackson N Gillenwaters
(74) *Attorney, Agent, or Firm* — Wood Herron & Evans LLP

(57) ABSTRACT

There is provided a pitch control system (210) for controlling a pitch force system (220) for pitching a blade (103) of a wind turbine (100), the pitch control system (210) being arranged for activating (682) an auxiliary pitch force subsystem (224) at an initiation point in time where a main pitch force is sufficient to pitch the blade (103) into a target pitch value. An advantage thereof may be that tracking of a target pitch value may be improved and the impact on the pitch force system (220) may be reduced. In aspects, there is furthermore presented a hydraulic pitch system (206), a wind turbine (100), a method and a computer program product.

14 Claims, 4 Drawing Sheets

(52) U.S. Cl.
CPC ... *F05B 2220/30* (2013.01); *F05B 2240/2212* (2013.01); *F05B 2260/74* (2013.01); *F05B 2260/76* (2013.01); *F05B 2260/79* (2013.01); *F05B 2260/80* (2013.01); *F05B 2260/821* (2013.01); *F05B 2270/1075* (2013.01); *F05B 2270/20* (2013.01); *F05B 2270/326* (2013.01); *F05B 2270/328* (2013.01); *F05B 2270/329* (2013.01); *F05B 2270/402* (2013.01); *F05B 2270/404* (2013.01); *F05B 2270/604* (2013.01); *Y02E 10/723* (2013.01)

(56) References Cited

U.S. PATENT DOCUMENTS

| | | | | |
|---|---|---|---|---|
| 8,105,029 | B2* | 1/2012 | Egedal | F03D 7/022 |
| | | | | 416/33 |
| 8,249,852 | B2* | 8/2012 | Thulke | F03D 7/045 |
| | | | | 703/18 |
| 8,916,988 | B2* | 12/2014 | Ridgway | F03D 7/0224 |
| | | | | 290/55 |
| 10,151,298 | B2* | 12/2018 | Bonding | F03D 7/0224 |
| 2003/0116970 | A1 | 6/2003 | Weitkamp et al. | |
| 2009/0184519 | A1 | 7/2009 | Nies et al. | |
| 2012/0134828 | A1* | 5/2012 | Andersen | F03D 7/0224 |
| | | | | 416/147 |
| 2014/0017081 | A1* | 1/2014 | Esbensen | F03D 7/0224 |
| | | | | 416/1 |
| 2014/0369836 | A1 | 12/2014 | Clark et al. | |
| 2016/0053745 | A1* | 2/2016 | Blom | F03D 7/045 |
| | | | | 416/1 |
| 2016/0305404 | A1* | 10/2016 | Esbensen | F03D 7/042 |

FOREIGN PATENT DOCUMENTS

| | | |
|---|---|---|
| CN | 102536660 A | 7/2012 |
| DE | 102009018305 A1 | 10/2010 |
| EP | 2725222 A2 | 4/2014 |
| GB | 2071781 A | 9/1981 |
| WO | 2012136279 A2 | 10/2012 |
| WO | 2013079071 A1 | 6/2013 |
| WO | 2013113317 A1 | 8/2013 |
| WO | 2014183941 A1 | 11/2014 |
| WO | 2015014367 A1 | 2/2015 |

OTHER PUBLICATIONS

European Patent Office, International Search Report and Written Opinion in PCT/DK2016/050329, dated Jan. 2, 2017.

Danish Patent and Trademark Office, Search and Examination Report in PA 2015 70658, dated May 23, 2016.

* cited by examiner

PITCH CONTROL SYSTEM FOR PITCHING WIND TURBINE BLADE

FIELD OF THE INVENTION

The invention relates to a pitch control system and more particularly to a pitch control system for controlling a pitch force system for pitching a blade of a wind turbine and a corresponding method and computer program product.

BACKGROUND OF THE INVENTION

In a wind turbine, a pitch system is used to control the pitch angle of the rotor blades in order to optimise the wind energy production and to ensure that the rotor blades are not subjected to too large loads when strong winds are blowing.

WO 2013/079071 A1 relates to a hydraulic pitch system for pitching a blade of a wind turbine having a hub by means of a hydraulic fluid.

WO 2015/014367 A1 discloses a fluid control system for operation of a pitch control system for wind turbines of the type comprising a pitch system driving at least one rotor blade, by at least one hydraulic actuator.

An improved pitch control system would be advantageous, and in particular a pitch control system, which may enable reducing forces applied on a controlled pitch force system, which may thus in term enable reducing wear and life-time impact on the pitch force system.

SUMMARY OF THE INVENTION

It may be seen as an object of the present invention to provide a pitch control system for controlling a pitch force system for pitching a blade of a wind turbine and a corresponding method and computer program product that may yield the above mentioned advantages.

It is a further object of the present invention to provide an alternative to the prior art.

According to a first aspect, the present invention relates to a pitch control system for controlling a pitch force system, such as the pitch force system being an electrical or hydraulic pitch force system, for pitching a blade of a wind turbine, the pitch control system being arranged for:

Controlling a main pitch force subsystem of the pitch force system, the main pitch force subsystem being capable of applying a main pitch force to the blade, controlling an auxiliary pitch force subsystem of the pitch force system, the auxiliary pitch force subsystem being capable of applying an auxiliary pitch force to the blade in addition to the main pitch force, wherein the pitch control system in a decision mode is arranged for:

Deciding, such as deciding at a decision point in time ($t_{dec}$), whether or not to activate the auxiliary pitch force subsystem and apply the auxiliary pitch force to the blade, activating the auxiliary pitch force subsystem for applying the auxiliary pitch force to the blade if it is decided to activate the auxiliary pitch force subsystem and apply the auxiliary pitch force to the blade, wherein the activating is initiated at an initiation point in time ($t_i$) where the main pitch force is sufficient to pitch the blade into a target pitch value corresponding to the initiation point in time.

It may be seen as an insight of the present inventors, that under certain conditions, e.g., with a relatively low capacity hydraulic pitching force system installed in a relatively large wind turbine, then an auxiliary pitching force may be required often, which may entail that:

The pump will have to work much harder to maintain the hydraulic fluid pressure (since a large fraction of the flow is sent to the low-pressure tank instead of being recirculated), the life-time of the pitch piston reduces as the fatigue impact can no longer be neglected, pitch tracking performance is reduced because the auxiliary pitch force subsystem is activated at points in time where the main pitch force system is insufficient, and where a large difference between target pitch value and actual value is already realized.

An advantage of the present aspect may be that when the auxiliary pitch force subsystem is applied when the required pitch force is relatively low with respect to the available main pitch force, then tracking may be improved and the impact on the pitch force system may be reduced (in particular with respect to a situation where the auxiliary pitch force subsystem is not applied until the main pitch force is insufficient to pitch the blade into a target pitch value). In case of a hydraulic pitch force system with a piston, the impact on the piston may be reduced. Another possible advantage may also be that it enables having or installing pitch force systems with relatively low capacity in relatively large wind turbines.

Each of the main and auxiliary pitch force subsystems may be an independent pitch force system or a part of one single pitch force system or an arrangement in a single pitch force system.

By 'auxiliary pitch force' may be understood a force which may be applied in addition to the main pitch force. The auxiliary pitch force may enable providing an increase or 'boost' to the pitch force, and the auxiliary pitch force subsystem may therefore provide a functionality which at least temporarily increases the pitch forces. The 'auxiliary pitch force' may be interchangeably referred to as 'boost' or 'boost force'.

By 'controlling a main or auxiliary pitch force subsystem' may be understood controlling, e.g., by sending a control signal to an actuator (e.g., an actuation controlling a valve in a hydraulic pitch force system), the main pitch force exerted by, respectively, the main or auxiliary pitch force subsystem.

By 'deciding whether or not to activate the auxiliary pitch force subsystem and apply the auxiliary pitch force to the blade' may be understood that the control system is arranged for receiving one or more pitch input parameters, and wherein the deciding is based on the one or more pitch input parameters. The deciding may be realized by an processor comprised within the pitch control system, which processor executes a deciding algorithm. It may be understood that the point in time in which the deciding takes place may in general be referred to as "decision point in time ($t_{dec}$)".

By 'wherein the activating is initiated at an initiation point in time ($t_i$)' may be understood that the point in time wherein the activating is initiated may in general be referred to as "initiation point in time ($t_i$)".

By 'target pitch value' is understood a theoretical pitch value which the pitch control system aims to reach in practice, and which target pitch value may be input into the pitch control system or calculated by the pitch control system. It may in general be understood, that the pitch value may refer to the pitch value of an individual rotor blade of a wind turbine, in which case the target pitch value at any given point in time is the aimed-for pitch angle of said rotor blade at the corresponding point in time.

By 'the main pitch force is sufficient to pitch the blade into a target pitch value' may be understood that an available force which may be provided by the main pitch force subsystem is equal to or larger than a force required to pitch the blade into a target pitch value, such as a desired pitch value.

According to one embodiment of the invention the deciding comprises:

Estimating, such as estimating at a decision point in time ($t_{dec}$), whether
- a required pitch force at a future point in time ($t_f$) for pitching the blade into a target pitch value corresponding to the future point in time exceeds
- a decision mode force threshold.

An advantage of this embodiment may be that it enables activating the auxiliary pitch force prior to a need for activating the auxiliary pitch force (as determined by whether or not the required pitch force exceeds the decision mode force threshold), which may in turn make an impact on the pitch force system smoother. In case of a hydraulic pitch force system, this may reduce the piston life-time impact.

This embodiment may be seen as a predictive activation method for the auxiliary pitch force, where the pitch control system may activate the auxiliary pitch force system based on an estimation or prediction about a future value, in particular a required pitch force at a future point in time.

It is to be understood that the future point in time ($t_f$) is later than the decision point in time ($t_{dec}$), such as that the initiation point in time being a point in time in the range at or after the decision point in time and before but not including the future point in time, i.e., the region mathematically described by $t_i \in [t_{dec}; t_f[$.

By 'decision mode force threshold' may be understood a threshold value with respect to an estimated available future main pitch force, where the future main pitch force may be an estimated available main pitch force at the future point in time.

In an embodiment, the estimated available future main pitch force may simply set as the maximum capacity of the main pitch force subsystem. In a more advanced embodiment, further factors may be taken into account, such as estimated demand for main pitch force in a period of time leading up to the future point in time, which may reduce a capability of the main pitch force subsystem at the future point in time with respect to a maximum capacity of the main pitch force subsystem.

The pitch control system according to this embodiment may then further be arranged for:

Activating the auxiliary pitch force system for applying the auxiliary pitch force to the blade if
the required pitch force for pitching the blade into the future target pitch value at the future point in time ($t_f$)
exceeds
the decision mode force threshold.

In a second aspect, the present invention relates to a hydraulic pitch system for pitching a blade of a wind turbine, the hydraulic pitch system comprising:

A pitch force system, being a hydraulic pitch force system, comprising:
A main pitch force subsystem, the main pitch force subsystem being capable of applying a main pitch force to the blade,
an auxiliary pitch force subsystem of the pitch force system, the auxiliary pitch force subsystem being capable of applying an auxiliary pitch force to the blade in addition to the main pitch force, and a pitch control system according to the first aspect arranged for controlling the pitch force system.

In a third aspect, the present invention relates to a wind turbine comprising a pitch control system according to the first aspect or a hydraulic pitch system according to the second aspect.

In a fourth aspect, the present invention relates to a method for controlling a pitch force system, the method comprising:

Deciding, such as deciding at a decision point in time ($t_{dec}$), whether or not to activate an auxiliary pitch force subsystem and apply an auxiliary pitch force to a blade of a wind turbine generator, the auxiliary pitch force subsystem being capable of applying an auxiliary pitch force to the blade in addition to a main pitch force, activating the auxiliary pitch force subsystem for applying the auxiliary pitch force to the blade if it is decided to activate the auxiliary pitch force subsystem and apply the auxiliary pitch force to the blade, wherein the activating is initiated at an initiation point in time ($t_i$) where a main pitch force is sufficient to pitch the blade into a target pitch value corresponding to the initiation point in time.

In a fifth aspect, the present invention relates to computer program product having instructions which, when executed cause a computing device or a computing system, such as the pitch control system according to the first aspect, to perform a method according to the fourth aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
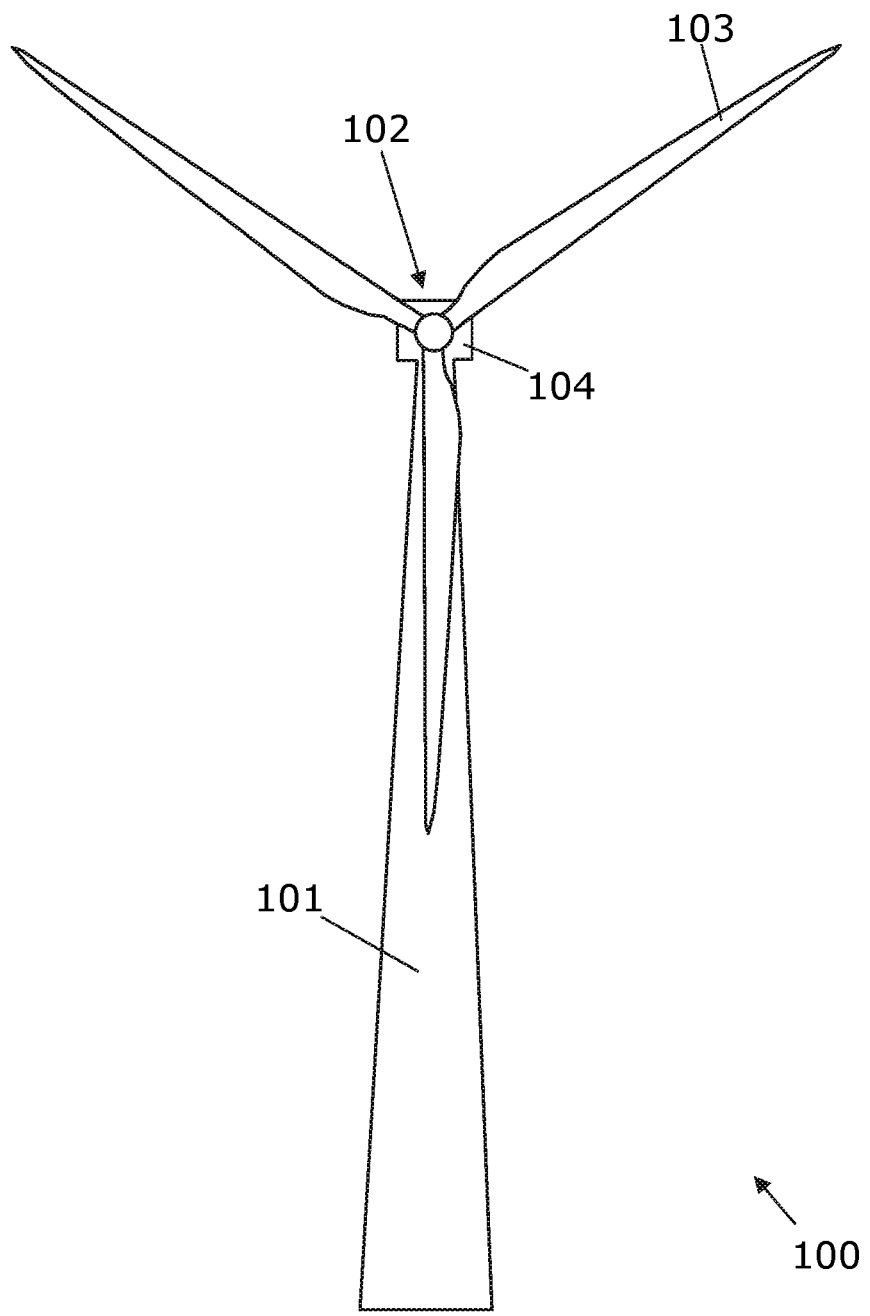
FIG. 1 shows a wind turbine.

FIG. 1 shows a wind turbine 100 (which may also be referred to as a wind turbine generator (WTG)) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g. in order to maximize uptake of the wind energy and to ensure that the rotor blades are not subjected to too large loads when strong winds are blowing. The blades are pitched by a pitch system with a pitch force system controlled by a pitch control system, where the pitch force system includes actuators for pitching the blades dependent on a pitch request from the pitch control system.

Figure 2:
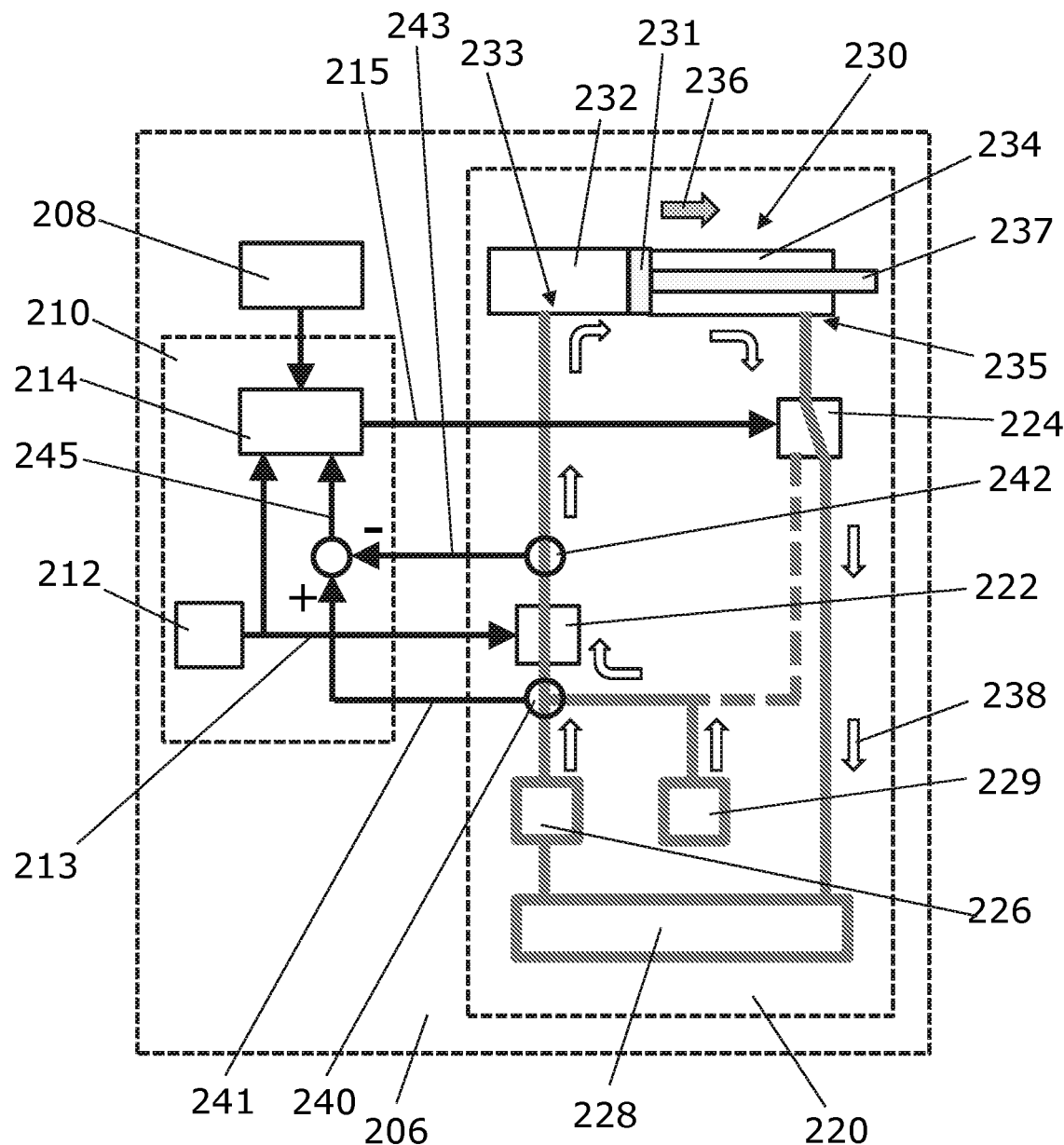
FIG. 2 shows a diagram of a hydraulic pitch system.

FIG. 2 shows a diagram of a hydraulic pitch system 206 for pitching a blade 103 of a wind turbine 100, the hydraulic pitch system 206 comprising:

A pitch force system 220, being a hydraulic pitch force system, comprising:
  A main pitch force subsystem 222, 226, 230, the main pitch force subsystem being capable of applying a main pitch force to the blade 103,
  an auxiliary pitch force subsystem 224 of the pitch force system 220, the auxiliary pitch force subsystem being capable of applying an auxiliary pitch force to the blade 103 in addition to the main pitch force, and
a pitch control system 210 according to the first aspect arranged for controlling the pitch force system 220.
The pitch force system is furthermore comprising:
A hydraulic cylinder 230 for adjusting a pitch angle of the blade, the hydraulic cylinder comprising:
  A pitch piston 231 movable in the hydraulic cylinder,
  a first port 233 fluidically connecting an inside of the hydraulic cylinder with an outside of the hydraulic cylinder and arranged on a first side 232 relative to the pitch piston, and
  a second port 235 fluidically connecting an inside of the hydraulic cylinder with an outside of the hydraulic cylinder and arranged on a second side 234 relative to the pitch piston, and
a tank 228 (which may also be referred to as a reservoir, or a hydraulic reservoir),
an accumulator 229,
a pump 226, such as an oil pump, arranged for pumping hydraulic fluid from the tank to a side of the pump being opposite the tank, such as to the accumulator 229, so that a pressure on the side of the pump being opposite the tank is higher than a pressure in the tank,
a main valve 222, such as a proportional valve, which upon opening fluidically connects the first port 233 to the side of the pump being opposite the tank, such as to the accumulator 229, and
an auxiliary valve 224, which upon opening fluidically connects the second port 235 to the tank 228,
wherein:
The main pitch force subsystem comprises the main valve 222, and wherein controlling the main pitch force subsystem comprises controlling the main valve, and
the auxiliary pitch force subsystem comprises the auxiliary valve 224, and wherein controlling the auxiliary pitch force subsystem comprises controlling the auxiliary valve, and wherein activating the auxiliary pitch force subsystem comprises opening the auxiliary valve.

It is noted that 'applying a pitch force to the blade' may in a hydraulic pitch force system be realized by having a differential pressure across the piston 231, so that the piston moves and thereby changes the pitch angle. When pitching out, the main pitch force may be generated via an increase in pressure on a first side 232 of the position 231 (which may also be referred to as 'a-side'). When pitching out, the auxiliary pitch force may be generated via a decrease in pressure on a second side 234 of the position 231 (which may also be referred to as 'b-side').

The 'main pitch force subsystem' may be seen as comprising pump 226, main valve 222, and pitch cylinder 230. By using the pump 226 to generate a higher pressure on the side of the pump fluidically connected to the main valve 222 than on the side fluidically connected to the tank 228, a main pitch force may be exerted by opening or having opened the main valve 222 so as to fluidically connect the side of the pump opposite the tank 228 with the first port 233, such as fluidically connecting the accumulator 229 with the first port 233. Thus, the main pitch force may be seen as a pitch force generated by increasing (with respect to time) a pressure on the first side 232 (a-side) of the piston.

The 'auxiliary pitch force subsystem' may be seen as comprising the auxiliary valve 224, which may be a 3-way valve with an inlet fluidically connected to the second port 235 and an outlet fluidically connected in an inactive state to the side of the pump opposite the tank, such as to the accumulator, and in an active state to the tank 228. Since the pressure in the tank 228 is lower than the pressure on the side of the pump 226 opposite the tank 228, then an auxiliary pitch force may be seen as a pitch force generated by decreasing (with respect to time) a pressure on the second side 234 (b-side) of the piston.

The non-filled arrows, such as arrow 238, indicate a direction of flow of hydraulic fluid.

The cylinder 230 may be a differential area cylinder, wherein the areas of the pitch piston 231 facing the first side 232 may be different, such as larger, than an area facing the second side 234, for example due to a piston rod 237 being placed on the second side.

The accumulator may be dispensed with, for example in embodiments with a pump with a large capacity. When referring to 'accumulator' in the present application, it is understood that this may in embodiments without an accumulator be exchanged with 'the side of the pump 226 facing the main valve 222, i.e., the side of the pump 226 opposite the tank 228.

The thick grey lines (in the hydraulic pitch force system 220) represent hydraulic lines. The thinner black arrows represent transmission of signals, such as electrical communication.

The present application focuses on issues related to pitching out (corresponding to moving the piston from left to right in FIG. 2 as indicated by thick filled arrow 236) and therefore only the configuration for moving the piston outwards is included in FIG. 2, i.e., for moving the piston from left to right in the figure. A hydraulic pitch system may furthermore comprise relevant components and arrangements for enabling pitching in the opposite direction, but these have been left out of the present figure for the sake of simplicity.

Main Pitch Force

FIG. 2 shows the auxiliary valve 224 in an active state where the second port 235 is fluidically connected to the (low-pressure) tank 228 by via the auxiliary valve 224. However, an auxiliary controller 214 may also control the auxiliary valve and set it in an inactive state where the second side 234 of the pitch cylinder 230 is fluidically connected with the accumulator 229 (as indicated in FIG. 2 via the dashed fluidic connection between auxiliary valve 224 and the accumulator 229). Then if a main controller 212 sees a difference between a target pitch value (a desired pitch position) and an actual position it transmits a main signal 213 to the main valve 222 to increase a flow to the first side 232 (a-side) of the pitch cylinder 230. This increases the pressure on the first side 232 of the piston and thus increases the pressure difference across the piston and thus applies a main pitch force in the outwards direction (from left to right in FIG. 2). The flow is re-circulated to conserve oil flow from the pump, i.e., the 3-way auxiliary valve 224 is arranged in this inactive state so that the second port 235 is fluidically connected to the accumulator 229. Energy is taken out of the pitch force system 220 to move the piston 231 so the pressure in the accumulator 229 drops. If the pressure level of the accumulator 229 goes below a certain level (an accumulator threshold), the pump 226 starts and brings the pressure in the accumulator 229 back to a higher pre-defined level (the accumulator threshold or higher).

The pressure applied by the oil is converted into a force pushing the piston 231 outwards. In order to move the piston 231, the pressure-generated force must be larger than external forces working in the other direction. For a pitch system in a wind turbine, these external forces come from aerodynamics (wind pushing the blade 103), gravity, and others such as a high level of friction (e.g., certain absolute angular pitch values are associated with a high level of friction). In some situations the force applied by the pressure is simply not large enough to overcome the external forces. In extreme situations it may be beneficial to be able to pitch out, since a pitch system failing to pitch out can compromise wind turbine safety.

However, the main pitch force may be insufficient to overcome external forces, and in such situation(s) an auxiliary pitch force subsystem would be beneficial for increasing the pressure difference across the piston 231 (at least temporarily) to be able to pitch the blade 103 out and get the external forces down and the turbine safety in control.

Auxiliary Pitch Force

In order to raise the pressure difference across the piston (at least temporarily, such as for a short period, e.g., 0.5 second) the second port 235 can be re-directed directly to the (low-pressure) tank 228 by activating the auxiliary valve 224. The activation of the auxiliary valve may take place upon if the auxiliary controller 214 provides as output an auxiliary signal 215 (such as a PFB actuation signal) to the auxiliary valve 224 (causing the auxiliary valve to be activated). This may lower the pressure in the second side 234 of the pitch cylinder and give a significantly higher pressure difference across the piston 231. This can thus serve as a "boost", and this option (activating the auxiliary pitch force subsystem, such as activating the auxiliary valve) may ensure that a wind turbine blade 103 can always pitch out of the wind and thereby reduce structural loads.

Whenever the auxiliary valve is activated the pressure difference across the piston 231 may increase almost instantaneously, which may impose some life-time reduction on the piston 231, in particular if not carried out according to the present invention.

Responsive Mode

In a responsive mode, the auxiliary pitch force system (which may referred to as 'pitch force boost' (PFB)) is activated when a pressure difference across the main valve 222 is low (meaning that there is no more pressure to apply to the hydraulic cylinder), and the main signal 213 to the proportional valve is high (above a certain threshold). The latter (main signal 213 being high) indicates that the main controller 212 is requesting more force to get the blade pitched further out. The auxiliary valve may then be kept open for a predefined time duration (e.g., 0.5 sec). If the conditions for activation are still active, the valve is kept open for longer time. In most cases 0.5 sec boosting is enough to get the pitching going.

The pressure difference across the main valve 222 may be obtained by the auxiliary controller via pressure difference signal 245 which is generated based on a accumulator pressure signal 241 from an accumulator pressure sensor 240 and an a-side pressure signal 243 from an a-side pressure sensor 242.

Decision Mode

In a decision mode the activation decision on whether or not to activate PFB may be taken and executed at a point in time where the main pitch force is actually sufficient to reach the target pitch value. The decision may be based on a prediction regarding future required pitch forces (said prediction optionally being based on historical data, such as short-time historical data).

The decision may in particular be based on the azimuth angle of the rotor and the actuation frequency within a given time window.

Figure 3:
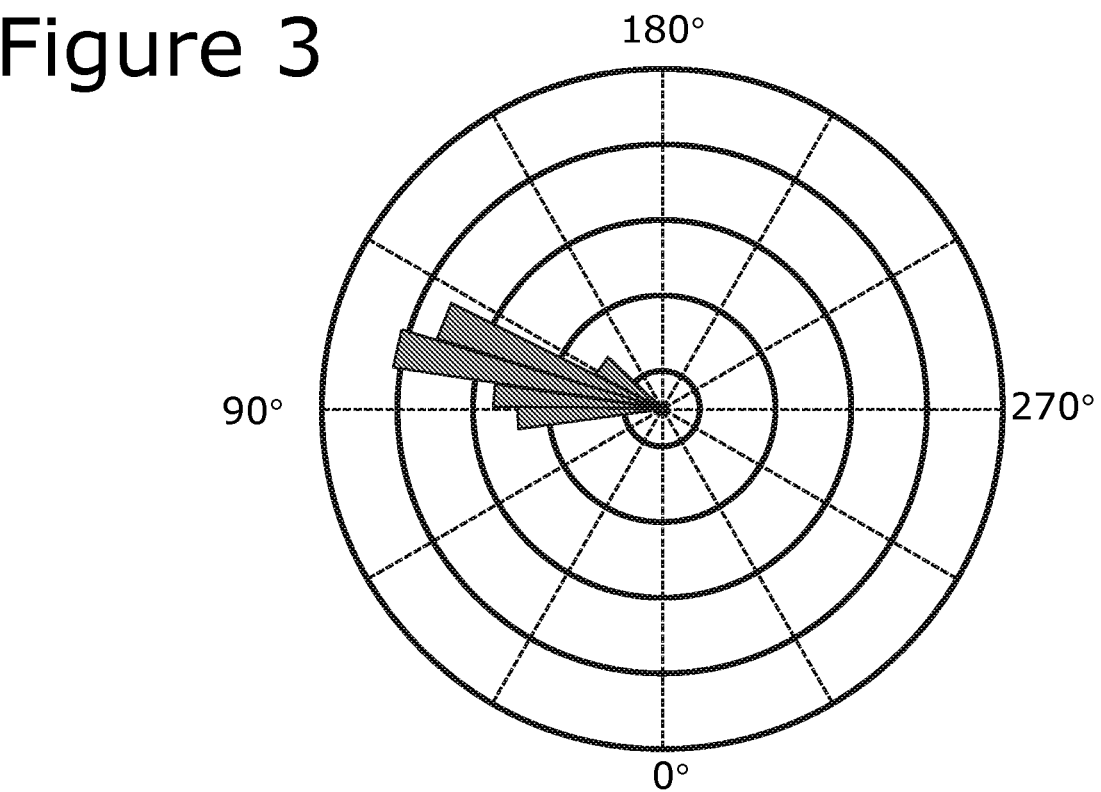
FIGS. 3-4 show possible polar plots of activations of auxiliary pitch force subsystem in a wind turbine with a pitch control system in responsive mode.

FIG. 3 shows a polar plot of activations of auxiliary pitch force subsystem as could be observed in a wind turbine with a pitch control system in responsive mode according to observations made by the inventors. It shows the PFB Activation rate for a blade of a wind turbine as a function of azimuth angle. There is a clear correlation between azimuth angle and activation. All activations are around 90 degrees (which is also the case for the other two blades), i.e. all PFB activations take place when the blade is coming from pointing vertically downwards, and has moved a quarter of a revolution and is then in a substantially horizontal position.

Figure 4:
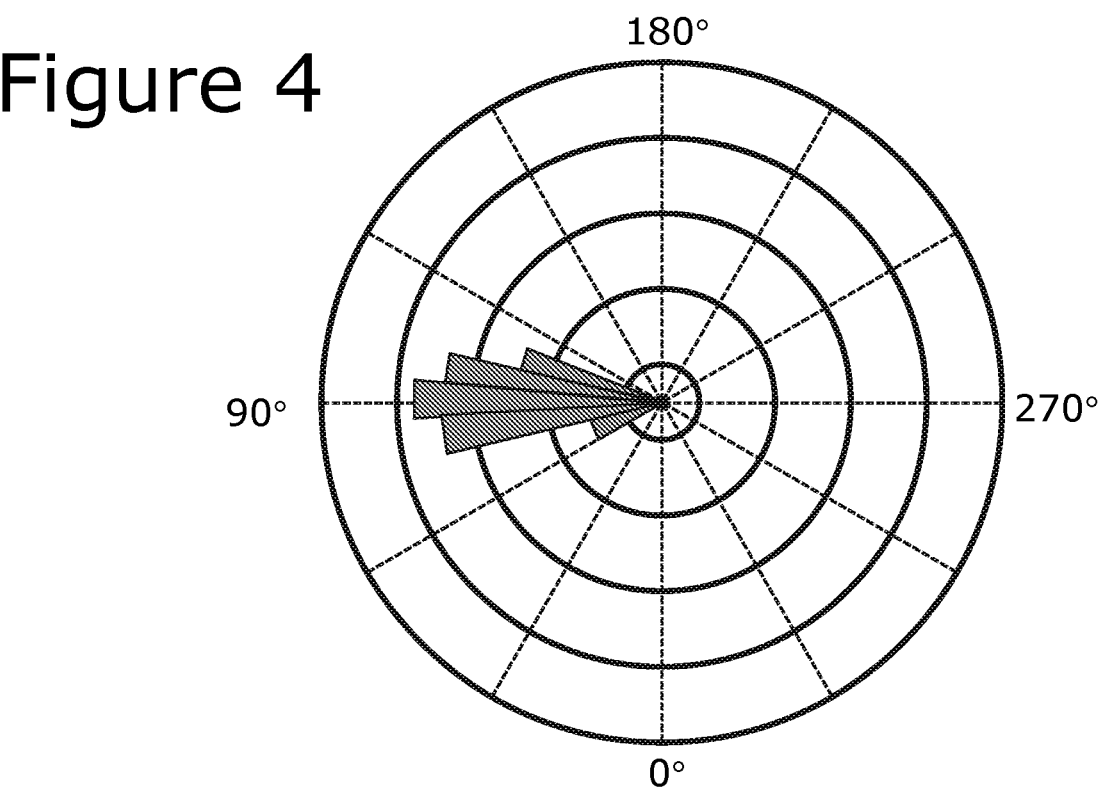

FIG. 4 shows a plot similar to FIG. 3, albeit for another blade of the same wind turbine. The last blade of the wind turbine could exhibit similar data according to observations made by the inventors.

Investigations of the cause of the increased activation rate have shown that the actuations are highly correlated with the azimuth angle and are pronounced when the thrust is high (wind speed around rated). In some situations the PFB activates when a blade is horizontal and on the way upwards (90 degrees). That is, when the pitch system is fighting a large thrust and gravity.

In an embodiment, a pitch control system 210 according to any one of the preceding claims, wherein the pitch control system is arranged for:
  Receiving one or more pitch input parameters 208,
  and wherein the deciding is based on the one or more pitch input parameters, and wherein the one or more pitch input parameters include one or more of:
  An azimuth angle of a rotor, such as wherein the activating takes place when the azimuth angle is within a defined azimuth interval, such as 80-100 degrees, such as 85-95 degrees,
  a pitch angle of the blade 103,
  a sensor value, such as a value obtained from a sensor, such as a force sensor mounted on or in connection with the blade 103 and arranged for measuring forces exerted on or within the blade 103,
  a thrust value.
  In particular, PFB activation may take place when the rotor is within a defined azimuth interval, for example 85 degrees to 95 degrees This will allow the high pressure difference to couple in a much gentler manner than if coupled in under situations with high forces.

When referring to azimuth angle of rotor, it is understood that it is the azimuth angle of the rotor for a given blade, where the azimuth angle is the angle around an axis orthogonal to the plane of the blades, and the azimuth angle 0 degrees corresponds to the blade being in a vertical position and pointing downwards, and an angle of 90 degrees corresponds to the blade having moved an angular distance corresponding to a quarter of a revolution in a direction of rotation to a horizontal position.

In an embodiment, a the one or more pitch input parameters 208 include:
The thrust value, and
the azimuth angle of the rotor, such as wherein the auxiliary pitch force system is activated at an initiation point in time ($t_i$) at a beginning of a time interval during which
the azimuth angle is within a azimuth interval, and
the thrust value is above a thrust threshold,
and wherein the auxiliary pitch force system is kept activated until an end of the time interval.

In an embodiment, a the one or more pitch input parameters include:
The thrust value, and
the azimuth angle of the rotor.

The azimuth angle of activation could also be monitored while in the responsive (normal) mode. If the variance of the determined azimuth angle was below a certain threshold it means that a transition into decision mode would be relevant and the azimuth thresholds could be determined from the observations. On the other hand, a large variance would deem the decision mode out.

In an embodiment, the pitch control system is arranged for operating in any one of a plurality of modes 550, 560, 570, where the plurality of modes comprises
the decision mode 560, and
one or more other modes 550, 570, wherein each of the one or more other modes is different with respect to the decision mode, such as wherein the auxiliary pitch force subsystem is triggered according to different criteria and/or at different points in time.

Having multiple modes may enable choosing between different modes, so that depending on the circumstances, a mode may be selected which is more optimal at a given point in time than the decision mode.

The pitch control system may be arranged for:
Determining in which mode of the plurality of modes 550, 560, 570 to operate.

By allowing the pitch control system itself to determine the mode, a self-contained and automated system may be achieved.

In an embodiment, a pitch control system 210 according to any one of the preceding claims, wherein the one or more other modes comprises a responsive 550 mode in which the pitch control system is arranged for:
Determining at a determination point in time ($t_{det}$) whether
a required pitch force for pitching the blade into a target pitch value corresponding to the determination point in time
exceeds
a responsive mode force threshold, such as a threshold value with respect to available main pitch force, such as the responsive mode force threshold being exceeded if an the required pitch force exceeds available main pitch force,
activating the auxiliary pitch force subsystem 224 for applying the auxiliary pitch force to the blade 103 if the required pitch force for pitching the blade into the target pitch value corresponding to the determination point in time ($t_{det}$)
exceeds
the responsive mode force threshold,
wherein the activating is initiated at a commencement point in time ($t_c$) where the main pitch force is insufficient to pitch the blade into a target pitch value corresponding to the commencement point in time ($t_c$).

A possible way of detecting if a required pitch force exceeds a responsive mode threshold, such as the available main pitch force, may be realized by observing the main signal and the pitch error (difference between target pitch value and actual value). If we are not capable of following the pitch reference while the valve is fully open (i.e., large pitch error although the main valve signal is large, i.e., even though the main pitch force is applied to its full extent, the system cannot track properly), we detect a problem in the form of required pitch force (for tracking) exceeds the available main pitch force.

Another possible way of detecting if a required pitch force exceeds a responsive mode threshold may comprise determining if:
the differential pressure across the pump is below a certain threshold (i.e., the main pitch force is utilized to a large extent, such as to a full extent),
and
a control signal to a valve is above a certain threshold (i.e., there is a tracking error which requires more pitch force).

In an embodiment, a transition 558, 579 into the decision mode 560, such as from the responsive mode 550, is triggered if within a preceding trigger amount of time:
A number of times which activating the auxiliary pitch force subsystem 224 has taken place
exceeds
an entry trigger threshold.

In an embodiment, a transition 568 from the decision mode 560 to another mode 570 is triggered if:
A trigger amount of time has passed after a transition 558, 579 into the decision mode 560,
or if within a preceding trigger amount of time:
A number of times which activating the auxiliary pitch force subsystem 224 has taken place
exceeds
an exit trigger threshold, such as 10 times within an hour.

In an embodiment the one or more other modes comprises a transition mode 570, wherein
a transition 568, 578 from the decision mode 560 to the responsive mode 550 takes place via a transition mode 570, and
wherein when in the transition mode 570 the pitch control system 210 is arranged for
changing mode from the transition mode 570 into any one of a plurality of modes 550, 560, such as into one of the responsive mode 550 and the decision mode 560.

Figure 5:
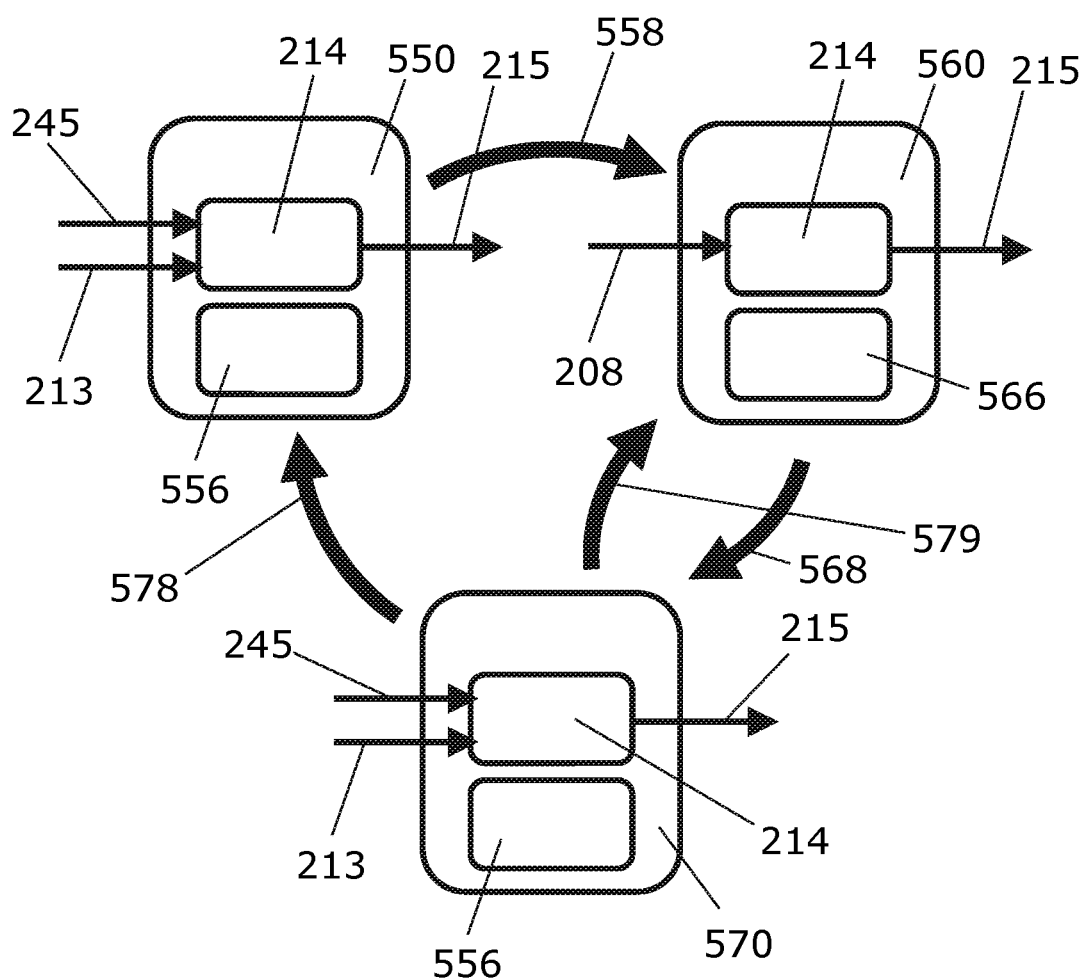
FIG. 5 shows a state diagram for a pitch control system.

FIG. 5 is a state diagram for a pitch control system. The pitch control may under normal operation be in the responsive (normal) mode.

In the responsive mode 550 a PFB actuation rate (or frequency) 556 may be monitored, and the auxiliary controller 214 may take as input a pressure difference signal 245 (such as said pressure difference signal being indicative of a pressure drop across main valve 222) and a main signal 213 (such as a proportional valve voltage), and provide as output an auxiliary signal 215 (such as a PFB actuation signal) to the auxiliary valve 224 (causing the auxiliary valve to be activated) if certain conditions are met.

If the PFB activation rate (i.e., the number of PFB activations within a certain time period) exceeds an entry threshold, a transition 558 from responsive mode 550 into decision mode 560 is triggered, such as to avoid eating life-time of the piston 231.

This may enable a lot of actuations of the auxiliary pitch force subsystem (such as for each blade). The pitch control system may then remain in the decision mode, even after this is no longer needed. In the decision mode 560 a PFB actuation rate and or a period of time since entry into decision mode may be monitored as indicated by box 566, and the auxiliary controller 214 may take as input one or more pitch input parameters 208 (such as azimuth angle) and provide as output an auxiliary signal 215 (such as a PFB actuation signal) to the auxiliary valve 224 (causing the auxiliary valve to be activated) if certain conditions are met.

In order to determine when to exit decision mode, a trial-and-error approach may be taken. In case a PFB actuation rate is above an exit trigger threshold, for example 10 times over an hour, a transition 568 from decision mode 560 into transition mode 570 is triggered. Alternatively, in case a predetermined period of time has passed since entry into decision mode 560 a transition 568 from decision mode 560 into transition mode 570 is triggered.

The transition mode 570 is similar to responsive mode, except that in the transition mode 570, the pitch control system 210 monitors if a PFB actuation rate (triggered according to a scheme similar to responsive mode) exceeds a threshold, such as a low threshold, for example 10 times per minute. If it does, the decision mode is (re-)entered 579. If not, the system is set back 578 to responsive (normal) mode (e.g., after a number of revolutions or after passing a period of time after entry 568 into transition mode 570) and the system again has to be exposed to a high rate of activations before entering into the decision mode 560.

Figure 6:
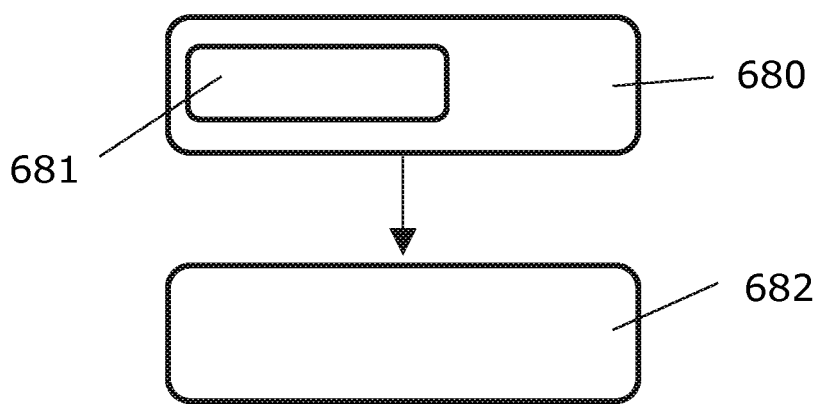
FIG. 6 shows a flow-chart of a method according to an embodiment.

FIG. 6 shows a flow-chart of a method for controlling a pitch force system 220, the method comprising:

Deciding 680, such as deciding at a decision point in time ($t_{dec}$), whether or not to activate an auxiliary pitch force subsystem 224 and apply an auxiliary pitch force to a blade 103 of a wind turbine 100, the auxiliary pitch force subsystem being capable of applying an auxiliary pitch force to the blade in addition to a main pitch force, activating 682 the auxiliary pitch force subsystem 224 for applying the auxiliary pitch force to the blade if it is decided to activate the auxiliary pitch force subsystem and apply the auxiliary pitch force to the blade 103, wherein the activating is initiated at an initiation point in time ($t_i$) where a main pitch force is sufficient to pitch the blade into a target pitch value corresponding to the initiation point in time, and wherein the deciding comprises estimating 681 whether a required pitch force at a future point in time ($t_f$) for pitching the blade 103 into a target pitch value corresponding to the future point in time exceeds a decision mode force threshold.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A pitch control system for controlling a pitch force system including a main pitch force subsystem capable of applying a main pitch force to a blade and an auxiliary pitch force subsystem that when activated boosts a capacity of the pitch force system from a first pitch force capacity to a second pitch force capacity BY applying an auxiliary pitch force to the blade in addition to the main pitch force, the pitch control system being arranged to:

estimate, at a decision point in time during which the first pitch force capacity is sufficient to pitch the blade into a target pitch value, a pitch force required to pitch the blade into the target pitch value at a future point in time; and in response to the pitch force required to pitch the blade into the target pitch value at the future point in time being greater than the first pitch force capacity, activate the auxiliary pitch force subsystem for applying the auxiliary pitch force to the blade at an initiation point in time prior to the future point in time and during which the first pitch force capacity is still sufficient to pitch the blade into the target pitch value corresponding to the initiation point in time.

2. The pitch control system according to claim 1, wherein the pitch control system is arranged to:

receive one or more pitch input parameters, wherein the pitch force required to pitch the blade into the target pitch value at the future point in time is estimated based on the one or more pitch input parameters, and wherein the one or more pitch input parameters include one or more of an azimuth angle of a rotor, a pitch angle of the blade, a sensor value, and a thrust value.

3. The pitch control system according to claim 2, wherein the one or more pitch input parameters include the thrust value and the azimuth angle of the rotor.

4. The pitch control system according to claim 1, wherein the pitch control system is arranged to operate in any one of a plurality of modes including a decision mode and one or more other modes each of which is different with respect to the decision mode.

5. The pitch control system according to claim 4, wherein the pitch control system is arranged to determine in which mode of the plurality of modes to operate.

6. The pitch control system according to claim 4, wherein the one or more other modes include a responsive mode in which the pitch control system is arranged to:

determine, at a determination point in time, whether a required pitch force for pitching the blade into the target pitch value corresponding to the determination point in time exceeds a responsive mode force threshold, and activate, at a commencement point in time, the auxiliary pitch force subsystem for applying the auxiliary pitch force to the blade if the required pitch force for pitching the blade into the target pitch value corresponding to the determination point in time exceeds the responsive mode force threshold, wherein the main pitch force is insufficient to pitch the blade into the target pitch value corresponding to the commencement point in time.

7. The pitch control system according to claim 5, wherein a transition into the decision mode is triggered if within a preceding trigger amount of time:

a number of times which activating the auxiliary pitch force subsystem has taken place exceeds an entry trigger threshold.

8. The pitch control system according to claim 5, wherein a transition from the decision mode to another mode is triggered if:
- a trigger amount of time has passed after a transition into the decision mode, or
- if within a preceding trigger amount of time:
  - a number of times which activating the auxiliary pitch force subsystem has taken place exceeds an exit trigger threshold.

9. The pitch control system according to claim 6, wherein the one or more other modes include a transition mode, wherein
- a transition from the decision mode to the responsive mode takes place via the transition mode, and
- the pitch control system is arranged to change from the transition mode into any one of a plurality of modes when in the transition mode.

10. A hydraulic pitch system for pitching a blade of a wind turbine, the hydraulic pitch system comprising:
- a hydraulic pitch force system including:
  - a main pitch force subsystem capable of applying a main pitch force to the blade, and
  - an auxiliary pitch force subsystem capable of applying an auxiliary pitch force to the blade in addition to the main pitch force, and
- the pitch control system according to claim 1.

11. The hydraulic pitch system according to claim 10, wherein the hydraulic pitch force system includes:
- a hydraulic cylinder for adjusting a pitch angle of the blade, the hydraulic cylinder comprising:
  - a pitch piston movable in the hydraulic cylinder,
  - a first port fluidically connecting an inside of the hydraulic cylinder with an outside of the hydraulic cylinder and arranged on a first side relative to the pitch piston, and
  - a second port fluidically connecting an inside of the hydraulic cylinder with an outside of the hydraulic cylinder and arranged on a second side relative to the pitch piston,
- a tank,
- a pump arranged for pumping hydraulic fluid from the tank to a side of the pump opposite the tank so that a pressure on the side of the pump opposite the tank is higher than the pressure in the tank,
- a main valve, which upon opening fluidically connects the first port to the side of the pump opposite the tank, and
- an auxiliary valve, which upon opening fluidically connects the second port to the tank, wherein:
- the main pitch force subsystem comprises the main valve, and wherein controlling the main pitch force subsystem comprises controlling the main valve,
- the auxiliary pitch force subsystem comprises the auxiliary valve,
- controlling the auxiliary pitch force subsystem comprises controlling the auxiliary valve, and
- activating the auxiliary pitch force subsystem comprises opening the auxiliary valve.

12. A wind turbine comprising the pitch control system according to claim 1.

13. A method for controlling a pitch force system including a main pitch force subsystem capable of applying a main pitch force to a blade and an auxiliary pitch force subsystem that when activated boosts a capacity of the pitch force system from a first pitch force capacity to a second pitch force capacity by applying an auxiliary pitch force to the blade in addition to the main pitch force, the method comprising:
- estimating, at a decision point in time during which a first pitch force capacity of the pitch force system is sufficient to pitch the blade into a target pitch value, the pitch force required to pitch the blade into the target pitch value at a future point in time; and
- in response to the pitch force required to pitch the blade into the target pitch value at the future point in time being greater than the first pitch force capacity, activating the auxiliary pitch force subsystem for applying the auxiliary pitch force to the blade at an initiation point in time prior to the future point in time and during which the first pitch force capacity is still sufficient to pitch the blade into the target pitch value corresponding to the initiation point in time.

14. A non-transitory computer-readable storage medium, having stored thereon a computer program, comprising instructions which, when executed by a computing device or a computing system, cause the computing device or the computing system to perform the method according to claim 13.

* * * * *